United States Patent [19]

Iino et al.

[11] Patent Number: 5,336,394
[45] Date of Patent: Aug. 9, 1994

[54] PROCESS FOR HYDRODESULFURIZING A SULFUR-CONTAINING HYDROCARBON

[75] Inventors: Akira Iino; Ryuichiro Iwamoto; Tsuyoshi Mitani, all of Sodegaura, Japan

[73] Assignees: Idemitsu Kosan Co., Ltd.; Petroleum Energy Center, both of Tokyo, Japan

[21] Appl. No.: 154,702

[22] Filed: Nov. 18, 1993

Related U.S. Application Data

[62] Division of Ser. No. 959,285, Oct. 9, 1992, Pat. No. 5,280,004.

[30] Foreign Application Priority Data

Oct. 24, 1991 [JP] Japan .................. 3-303855

[51] Int. Cl.$^5$ .................. G10G 45/08; G10G 49/04
[52] U.S. Cl. .................. 208/216 R; 208/254 H; 208/143
[58] Field of Search .................. 502/314; 208/216 R, 208/216 PP, 217, 254 H

[56] References Cited

U.S. PATENT DOCUMENTS

| | | | |
|---|---|---|---|
| 4,081,353 | 3/1978 | Kehl et al. | 208/216 R |
| 4,179,410 | 12/1979 | Simpson | 502/314 |
| 4,483,942 | 11/1984 | Sekido et al. | 502/314 |
| 4,615,999 | 10/1986 | Takumi et al. | 502/314 |
| 4,879,265 | 11/1989 | Simpson et al. | 502/314 |
| 4,997,801 | 3/1991 | Mitarai et al. | 208/216 R |
| 5,198,100 | 3/1993 | Aldridge et al. | 208/216 R |

FOREIGN PATENT DOCUMENTS

| | | |
|---|---|---|
| 0317034 | 5/1989 | European Pat. Off. . |
| 0496592 | 7/1992 | European Pat. Off. . |
| 51-24593 | 2/1976 | Japan . |
| 61-138537 | 6/1986 | Japan . |
| 63-123444 | 5/1988 | Japan . |
| 3-12935 | 2/1991 | Japan . |

OTHER PUBLICATIONS

Yoshihide Kotera et al, "Hydrodesulfurization Catalysts for Residual Oil. I. Preparation and its effect on the Hydrodesulfurization Activities of Molybdenum Oxide–Cobalt Oxide–Aluminum Oxide Catalysts", *Kogyo Kagaku Zasshi*, 74(3), (1971), 330–335 and English language abstract.

*Primary Examiner*—Paul E. Konopka
*Attorney, Agent, or Firm*—Frishauf, Holtz, Goodman & Woodward

[57] ABSTRACT

A process for hydrodesulfurizing a sulfur-containing hydrocarbon which comprises contacting the sulfur-containing hydrocarbon under hydrodesulfurizing conditions in the presence of hydrogen with a catalyst composition comprising a Group VIA metal, a Group VIII metal and an alumina, the catalyst composition containing the Group VIA metal and the Group VIII metal in a combined amount of 20 to 70% by weight based on the total of the Group VIA metal, the Group VIII metal and the alumina. The catalyst composition being characterized by (i) an X-ray diffraction pattern having no diffraction peak other than that of the alumina, and, (ii) after being air-calcined at 550° C. for three hours, being characterized by a TRP which results in a ratio of the area L of a low temperature reduction peak to the area H of a high temperature reduction peak, L/H, of 0.1 to 0.45.

19 Claims, No Drawings

PROCESS FOR HYDRODESULFURIZING A SULFUR-CONTAINING HYDROCARBON

This is a division of application Ser. No. 07/959,285 filed Oct. 9, 1992, now U.S. Pat. No. 5,280,004.

BACKGROUND OF THE INVENTION (a) Field of the Invention

The present invention relates to novel catalyst compositions and a method for preparing same. More particularly, the present invention relates to novel catalyst compositions which are extremely useful catalysts for hydrodesulfurizing or hydrodenitrifying hydrocarbon distillates containing sulfur-containing hydrocarbon molecules or nitrogen-containing hydrocarbon molecules, such as kerosene-gas oil distillates, and are also suitable catalysts for hydrogenating or hydro-refining various hydrocarbons, for example, for hydrogenating aromatic hydrocarbons such as dimethylnaphthalenes.

The present invention further relates to an advantageous process for hydrodesulfurizing sulfur-containing hydrocarbons by using the catalyst compositions as above described, which produces hydrocarbons well free of sulfur from various sulfur-containing hydrocarbons, for example hydrocarbon distillates containing sulfur-containing hydrocarbon molecules, such as kerosene-gas oil distillates.

(b) Description of the Related Art

Recently worldwide environmental disruption has become a serious problem. In particular, combustion of fossil fuels, such as petroleums and coals, and combustion of sulfur-containing fuels generate respectively nitrogen oxides ($NO_x$) and sulfur oxides ($SO_x$), which when released into the atmosphere, make acidic rain or acidic fog, causing severe damage to the natural environment of forests, lakes and marshes. Also, $SO_x$, $NO_x$ and the particulates (for example, the particulates of soot, dust and mist) released with combustion exhaust exert a baneful influence upon human bodies inhaling them. This requires measures to reduce the release of these pollutants including $SO_x$, $NO_x$ and the particulates, as far as possible.

A common measure of reducing the $SO_x$ release is a treatment after combustion, i.e. flue gas desulfurization, but it is impractical for moving exhaust sources such as motorcars even if it becomes operable technically. It is therefore desirable to reduce the sulfur content in fuels so that the flue gas desulfurization becomes unnecessary.

On the other hand, $NO_x$ generate necessarily even from fuels well denitrified except for combustion without air, and the particulates occur in a large quantity depending on the kinds of fuels and the manners of combustion, thereby necessitating exhaust gas treatments for inhibiting their release into the atmosphere.

In the case of stationary exhaust sources, such as boilers, it has become possible to remove fairly well the atmospheric pollutants, such as $SO_x$, $NO_x$ and the particulates, by flue gas desulfurization or denitrogenation. However, in the case of diesel engines of trucks or the like, which are moving exhaust sources of these pollutants and release exhaust containing large quantities of $NO_x$ and the particulates including soot, these pollutants are released as they are into atmosphere because the removal thereof from the exhaust is technically difficult. Diesel engines utilize gas oils or the like as fuels and release exhaust containing $SO_x$ in a considerably high concentration because of the present insufficient reduction of sulfur content in the fuels. The $SO_x$ contained in the exhaust are not only a cause of atmospheric pollution but also one of the major obstacles in removing the $NO_x$ contained in the same exhaust. Removal of $NO_x$ from the exhaust from diesel engines requires treating the exhaust with after-treatment apparatuses and dehydrogenation catalysts. During such an after-treatment, if the concentration of the coexisting $SO_x$ has not been reduced sufficiently, poisoning of the catalysts is accelerated considerably, thereby making it difficult to stably maintain the catalytic functions for a long term. That is, sufficient reduction of the sulfur content in diesel fuels, such as gas oils, is necessary also from the viewpoint of maintaining the catalytic functions.

In addition to the problems in the fuel fields, sulfur compounds or organic nitrogen compounds contained in hydrocarbons generally deteriorate the catalytic functions in many catalytic processes, such as catalytic cracking or catalytic reforming processes. This also causes a strong demand for the development of improved techniques for effective removal of the sulfur compounds and organic nitrogen compounds from material hydrocarbons, particularly a strong demand for improved hydrodesulfurization catalysts and processes.

There have been developed many techniques for hydrodesulfurizing sulfur-containing hydrocarbons. Among various catalysts proposed in the conventional techniques as active catalysts for hydrodesulfurizing gas oil distillates or the like, typical ones widely used are catalysts obtained by improving those comprising an alumina and Group VIA and VIII metals of the Periodic table supported on the alumina, such as $CoO \cdot MoO_3/Al_2O_3$, $NiO \cdot MoO_3/Al_2O_3$ and $NiO \cdot WO_3/Al_2O_3$. For the reasons as above described, these conventional hydrodesulfurization catalysts however require further improvement in their catalytic functions.

These conventional hydrodesulfurization catalysts have generally been prepared by an impregnation technique, wherein an alumina support prepared by calcining an alumina gel is impregnated with metal salts of Group VIA metals and Group VIII metals. However, by the impregnation technique, it is difficult to improve the catalytic functions by increasing the ratio of the supported active metal components, i.e. the supported effective components consisting of Group VIA and Group VIII metals, because of the difficulty in impregnating an increased quantity of the active metal components, and even if it is performed, the supported active metal components cohere easily to lower their dispersion, and the lowered dispersion results in an insufficient improvement of activity or, under certain circumstances, rather reduces the catalytic functions including activity.

An improved technique is proposed in Japanese Patent Application Kokoku Koho (publication) No. 3-12935, wherein the impregnation is carried out in the presence of additives, such as oxy acids (aliphatic oxy acids). Nevertheless, the improved technique employing an impregnation technique also causes the cohesion of the metal components supported in an increased quantity, and cannot improve the activity sufficiently.

Another known method employs a kneading technique, wherein catalysts are prepared by calcining a kneaded mixture of an alumina gel (hydrogel) and metal salts (aqueous solution). This method is superior to the impregnation technique because the kneading technique generally permits stable support of a high percentage of the active metal components and is easy to operate. However, there are reports of the lower activity of the catalysts obtained by the kneading technique as compared with that of the catalysts obtained by the impregnation technique [Industrial Chemistry Journal (Kogyo Kagaku Zasshi), volume 74, No. 3, pages 330–335 (1971)].

There are some attempts to develop newly-contrived methods of preparing catalysts by employing kneading techniques. For example, there have been proposed a method of adding a phosphorus component into the kneading materials (Japanese Patent Application Kokai Koho (Laid-open) No. 61-123444) and a method of combining kneading and impregnation (Japanese Patent Application Kokai Koho (Laid-open) Nos. 61-138537 and 51-24593). However, these methods require very complicated procedures, which causes an increase in the production cost.

SUMMARY OF THE INVENTION

The present invention was made in view of the circumstances as above described.

An object of the present invention is to provide catalyst compositions which are easy to prepare and are improved in catalytic functions including catalytic activity as compared with the hydrodesulfurization catalysts prepared by the conventional methods so that they can be advantageously used as catalysts for hydrodesulfurization or hydrodenitrification of sulfur- or nitrogen-containing hydrocarbon distillates, such as gas oil distillates or kerosene distillates, and as catalysts for hydrogenation or hydro-refining of various hydrocarbons, for example in the hydrogenation of aromatic hydrocarbons, such as dimethylnaphthalenes.

Another object of the present invention is to provide a process particularly suitable for the preparation of the catalyst compositions of the present invention.

Another object of the present invention is to provide an advantageous process for hydrodesulfurizing sulfur-containing hydrocarbons, which is suitable for producing hydrocarbons with a sufficiently reduced sulfur content from various sulfur-containing hydrocarbons, for example hydrocarbon distillates containing sulfur-containing hydrocarbon molecules, such as gas oil distillates and kerosene distillates.

The inventors made researches in catalysts comprising Group VIA and Group VIII metals and an alumina in order to improve their catalytic functions including activity in hydrodesulfurization of sulfur-containing hydrocarbons, such as gas oil distillates. As the result, they succeeded in producing catalysts supporting the metal components in an extremely high percentage and in a highly dispersed state. Then, they prepared catalysts having various compositions and various properties by changing the preparation procedures and conditions, and they investigated the hydrodesulfurizing activity or properties of the catalysts obtained. Consequently, they found that highly dispersed novel catalyst compositions having a specifically high range of metal component content, exhibiting no X-ray diffraction peaks due to the metal components and exhibiting specific characteristics in temperature programmed reduction (TPR) exhibit a significantly high activity for the hydrodesulfurization of various sulfur-containing hydrocarbons, such as gas oil distillates and kerosene distillates, and are superior to the conventional hydrodesulfurization catalysts of this kind.

They also found the novel catalyst compositions to be excellent catalysts exhibiting high activity not only in hydrodesulfurization but also in the hydrodenitrification of nitrogen-containing hydrocarbons and in the hydrogenation of aromatic hydrocarbons.

Further, they studied the methods for effectively preparing the novel catalyst compositions, and they found that the novel and excellent catalyst compositions could be produced with a simple procedure by employing a specific kneading technique wherein aqueous solutions of salts (compounds) of the above-described metals and an alumina were kneaded in the presence of specific compounds, i.e. aliphatic oxy acids.

As the result of the inventors' investigation in the hydrodesulfurization of sulfur-containing hydrocarbons, such as gas oil distillates and kerosene distillates, catalyzed by these catalyst compositions, it was confirmed that a process employing the catalyst compositions of the present invention reduces the sulfur content more efficiently than the methods employing the conventional hydrodesulfurization catalysts of this kind and is advantageously applicable to industrial hydrodesulfurization of sulfur-containing hydrocarbons.

On the basis of these findings, the inventors completed the present invention.

That is, the present invention provides a catalyst composition comprising a Group VIA metal of the Periodic Table, a Group VIII metal of the Periodic Table and an alumina, the catalyst composition containing the Group VIA metal and the Group VIII metal in a combined amount of 20 to 70% by weight based on the total of the Group VIA metal, the Group VIII metal and the alumina, as calculated with the Group VIA metal and the Group VIII metal regarded as stable oxides thereof, and the alumina as $Al_2O_3$, being characterized by an X-ray diffraction pattern having no diffraction peak other than a diffraction peak of the alumina, and after air-calcined at 550° C. for three hours, being characterized by a TPR spectrum from a temperature-programmed reduction of the air-calcined catalyst in a stream of hydrogen with temperature being elevated from 25° C. to above 1000° C. at a rate of 10° C./min, in that the TPR spectrum gives a ratio of an area L of a low temperature reduction peak within a temperature range not lower than 25° C. and lower than 500° C. to an area H of a high temperature reduction peak within a temperature range from 500° C. to 1000° C., L/H, ranging from 0.1 to 0.45, with the proviso that when the low temperature reduction peak is not completely separated from the high temperature reduction peak, the area L and the area H are calculated by dividing the low temperature reduction peak and the high temperature reduction peak from each other at a temperature exhibiting the least consumption of hydrogen.

The present invention further provides a method of preparing the catalyst composition of the present invention, which comprises kneading, in the presence of an aliphatic oxy acid, an alumina with an aqueous solution containing a compound of a Group VIA metal and a compound of a Group VIII metal dissolved therein.

The present invention further provides as a particularly useful and effective process among various reaction processes using the catalyst composition of the present invention, a process for hydrodesulfurizing a sulfur-containing hydrocarbon which comprises contacting the sulfur-containing hydrocarbon with the catalyst composition of the present invention under hydrodesulfurizing conditions in the presence of hydrogen.

DESCRIPTION OF THE PREFERRED EMBODIMENTS

The catalyst composition of the present invention contains at least one Group VIA metal and at least one Group VIII metal. Group VIA metals include chromium, molybdenum and tungsten. The Group VIA metal to be used may be chosen according to the kind of the catalytic reaction using the catalyst composition and the kind of the other metal component used. Group VIA metals may be used individually or as a mixture of two or more of them. Suitable metals for the hydrodesulfurization process of the present invention are molybdenum and tungsten.

Group VIII metals include iron, cobalt, nickel, ruthenium, rhodium, palladium, osmium, iridium and platinum. The Group VIII metal to be used may be chosen according to the kind of the catalytic reaction using the catalyst composition and the kind of the other metal component used. Group VIII metals may be used individually or as a mixture of two or more of them. Suitable metals for the hydrodesulfurization process of the present invention are cobalt and nickel.

It is an important point that the catalyst composition of the present invention contains at least one Group VIA metal and at least one Group VIII metal. The combination of Group VIA metals and Group VIII metals may be chosen according to circumstances as above described. When the catalyst composition of the present invention is used for the hydrodesulfurization process of the present invention, it is suitable to combine at least one of cobalt and nickel with at least one of molybdenum and tungsten, and preferred examples include a combination of cobalt and molybdenum, a combination of nickel and molybdenum, a combination of nickel and tungsten and a combination of cobalt, nickel and molybdenum. A particularly preferred is a combination of cobalt and molybdenum.

The Group VIA metals and Group VIII metals are not always supported in the state of metals. For example, when the catalyst composition is calcined according to an ordinary method, these metals, partially or wholly, are supported usually in the state of oxides or compound oxides thereof. Concretely, cobalt, nickel, molybdenum and tungsten are supposed to be in the state of $CoO$, $NiO$, $MoO_3$ and $WO_3$, respectively, and when supported in combinations, they are also supposed to be in the state of compound oxides, such as $CoMoO_4$ and $CoWO_4$. After a reduction treatment, a part (most part, depending on the metals) of them are usually in the state of metals or oxides or compound oxides of a low oxidation state. Further, after presulfurization or during their use in desulfurization, a part of these metals are supposed to be in the state of sulfurized compounds. That is, the catalyst composition contains these metals as various compounds thereof depending on the conditions of pretreatments and uses.

The catalyst composition of the present invention contains the Group VIA metal and the Group VIII metal in a combined amount of 20 to 70% by weight, preferably 22 to 50% by weight, based on the total of the Group VIA metal, Group VIII metal and alumina, as calculated with the Group VIA metal and the Group VIII metal regarded as stable oxides thereof, and the alumina as $Al_2O_3$. Provided that, in the present invention, the term "alumina" includes not only a pure alumina but also ones contained as other aluminum oxides. The terms "stable oxides" mean $Cr_2O_3$, $MoO_3$ and $WO_3$ as to chromium, molybdenum and tungsten, respectively, $Fe_2O_3$, $CoO$ and $NiO$ as to iron, cobalt and nickel, respectively, and $RuO_2$, $Rh_2O_3$, $PdO$, $OsO_2$, $Ir_2O_3$ and $PtO$ as to other platinum metals. That is, the total content of the Group VIA metal and the Group VIII metal (supporting ratio) is calculated by regarding that the metals are contained in the state of oxides thereof.

If the total content of the metal components as oxides thereof is less than 20% by weight, the ratio of the active components will be too little to exhibit a desired high catalytic activity, particularly hydrodesulfurizing activity, hydrodenitrifying activity or hydrogenating activity, and if it is more than 70% by weight, the excessively high supporting ratio of the metal components will cause the cohesion of the metal components to impair the supporting state. The total content of the metal components as oxides thereof ranging from 20 to 70% by weight, particularly from 22 to 50% by weight provides a sufficiently high ratio and dispersion of the metal components supported as active components, thereby ensuring an extremely high catalytic activity and excellent catalytic functions in various hydrogenation reactions, particularly in the hydrodesulfurization that will be described later.

The content (supporting ratio) of each of the Group VIA metal and Group VIII metal may be varied depending on the reactions wherein the catalyst composition is to be used or on the kinds and combination of the metals used. For example, when the catalyst composition of the present invention is to be used in the hydrodesulfurization as described later, preferred respective contents of molybdenum and tungsten are 10 to 60% by weight, more preferably 12 to 50% by weight as calculated as $MoO_3$ and $WO_3$, and preferred respective contents of cobalt and nickel are 2 to 30% by weight, more preferably 3 to 15% by weight as calculated as $CoO$ and $NiO$. A particularly preferred combination is a combination of cobalt and molybdenum, and the suitable weight ratio of $CoO/MoO_3$ in the combination ranges from 0.10 to 0.50, preferably from 0.15 to 0.45.

It is also important that in addition to the metal components (hereinafter, sometimes referred to as active metal components), the catalyst composition of the present invention contains an alumina. It is desirable that the alumina in the catalyst composition supports the active metal components as effectively as possible in a highly dispersed state, and a part of the alumina may form compounds or solid solutions with the metal components. Further, the alumina may contain other components, such as a silica component, a boria component, a phosphoric acid component and a sodium component. That is, it should be noted that the alumina is not always contained as a pure alumina support. As to the structure of the alumina analyzed from an X-ray diffraction pattern, it is generally desirable that the alumina in the catalyst composition has a fine pore structure providing a large surface area, such as those of $\gamma$-alumina or $\eta$-alumina.

When all aluminum components are regarded as $Al_2O_3$, and the active metal components as oxides thereof, the content of the alumina (alumina component) in the catalyst composition is 30 to 80% by weight based on the total of the $Al_2O_3$ and the oxides of the active metal components.

It is also important in the present invention that the X-ray diffraction (XRD) pattern of the catalyst composition exhibits no diffraction peak other than that of the alumina. That is, the active metal components in the catalyst composition essentially have the form or properties of a completely amorphous state from the X-ray viewpoint. The form or properties of the active metal components influence considerably the catalytic functions including catalytic activity. The presence of the characteristic diffraction peaks of the metals of the active metal components or the compounds thereof, such as oxides or compound oxides, indicates a poor dispersion, which makes it impossible to attain the activity and catalytic functions of such a high level as aimed at in the present invention.

After air-calcined at 550° C. for three hours, the catalyst composition of the present invention is characterized by a TPR spectrum from a temperature-programmed reduction of the air-calcined catalyst in a stream of hydrogen with temperature being elevated from 25° C. to above 1000° C. at a rate of 10° C./min, in that the TPR spectrum gives a ratio of an area L of a low temperature reduction peak within a temperature range not lower than 25° C. and lower than 500° C. to an area H of a high temperature reduction peak within a temperature range from 500° C. to 1000° C., L/H, ranging from 0.1 to 0.45, preferably from 0.15 to 0.43. Provided that when the low temperature reduction peak is not completely separated from the high temperature reduction peak, the areas L and H are calculated by dividing the low temperature reduction peak and the high temperature reduction peak from each other at a temperature exhibiting the least consumption of hydrogen.

The stream of hydrogen at the time of the measurement of the TPR spectrum is made by flowing a gas mixture of hydrogen and argon gas (hydrogen concentration: 65% by volume) at a uniform flow rate of 20 ml/min.

When the peak area ratio L/H as measured as above described is more than 0.45, the dispersion of the supported metal components (active metal components) is not sufficient to attain sufficient catalytic functions, for example, sufficiently high catalytic activities for hydrogenation reactions including the hydrodesulfurization as described later. When L/H is less than 0.1, the metal components are not well supported, also resulting in insufficient catalytic functions.

In this kind of catalysts represented by $CoO \cdot MoO_3/Al_2O_3$, the area ratios in the TPR spectrums thereof between the low temperature reduction peaks and the high temperature reduction peaks, L/H, are known to be an index of the dispersion of the metal components supported.

When measured in accordance with the method common in the field of catalysts, a sample usually exhibits almost the same TPR spectrum in spite of a little variation in the measuring conditions, such as the rate of temperature elevation or the hydrogen pressure. However, it is also known that some conditions make a little difference in the locations or shapes of the peaks. In order to avoid such uncertainty, the conditions of measuring the TPR spectrum are specified in this specification. It should be noted that under certain measuring conditions different from the specified conditions of measuring TPR spectrum, even the same sample may have a peak area ratio L/H different from the above-described range, and particularly, differences in the pretreatment conditions may cause a great difference. More concrete procedures and conditions employed for measuring the TPR spectrum to evaluate the peak area ratio L/H are described in Examples.

As described above, the catalyst composition of the present invention contains the active metal components in a specifically high range of content and is characterized by the specific form or properties evaluated by their X-ray diffraction pattern and TPR spectrum. The catalyst composition of the present invention is not particularly limited in other aspects, and its properties may be adjusted to its use. The catalyst composition according to need may contain other components so far as the object of the present invention can be attained, and also may be pretreated to optimize its suitability for a certain reaction.

As to pore distribution, preferred catalyst compositions of the present invention contain pores of 150 angstroms or less in diameter in an amount of 80 to 100% by volume, more preferably 82 to 98% by volume based on the whole pore volume. Such catalyst compositions are suitable for many reactions, particularly for the hydrodesulfurization described later.

The catalyst composition of the present invention may contain other components for reinforcing or stabilizing the catalyst structure or additives for controlling the catalytic functions, such as the acidity thereof. Further, the catalyst composition of the present invention may be dispersed or added into other supports or may be mixed with other catalysts to be used for composite catalyst systems.

The shape of the catalyst composition of the present invention is not particularly limited, and may be of various types of particles or moldings, for example, powder of fine particles, granules, pellets, spherically molded particles and monoliths. Proper binders may be used for the molding.

Prior to use in a reaction, the catalyst composition of the present invention, according to demand, may be adapted for the reaction by various pretreatments for improving, controlling or retaining catalytic functions (activity, selectivity, lifetime and stability), for example, calcining, activation, oxidation, reduction, presulfurization, acidic gas treatment, steaming, preliminary reaction, inert gas treatment or evacuation.

Though the catalyst composition of the present invention is a particularly suitable catalyst for the hydrodesulfurization of various sulfur-containing hydrocarbons such as gas oil distillates and kerosene distillates, it is also applicable advantageously as a good catalyst for reactions requiring various hydrogenation functions, for example, for the hydrodenitrification of nitrogen-containing hydrocarbons, hydrogenation of various aromatic hydrocarbons, such as dimethylnaphthalenes, and hydrogenation of other hydrocarbons.

Though the method of preparing the catalyst composition of the present invention is not particularly limited, it is particularly suitable to employ the following method (it will be sometimes called the method of the present invention).

That is, the catalyst composition of the present invention may be prepared suitably by kneading, in the presence of an aliphatic oxy acid, an alumina with an aqueous solution containing a compound of a Group VIA metal and a compound of a Group VIII metal dissolved therein.

The alumina to be used for the kneading may be an alumina gel, a dried or calcined product of the alumina gel or those containing an alumina sol. An alumina gel is preferable for obtaining a uniform mixture of the alumina and the metals.

Alumina gels can be prepared easily by employing common methods. For example, they are suitably obtainable by neutralization titration of sodium aluminate with aluminum sulfate, dropping of acids into sodium aluminate or potassium aluminate or dropping of alkalis into aluminum sulfate, aluminum nitrate or aluminum chloride, followed by separation and washing of the resulting precipitate to remove impurities including salts of the alkalis or acids. It is also possible to utilize gelation of commercial alumina sols, for example, by thermal concentration. The alumina gels thus obtained may be aged prior to use according to demand. At the time of preparing these alumina gels, various compounds to be suitable additive components, such as a silica component, a phosphorus component or a boria component, may be added to reinforce or stabilize the catalyst structure or to control the acidity.

Various compounds of Group VIA metals may be used as preparation materials of the aqueous solution to be used for the kneading, and preferred are compounds of molybdenum and compounds of tungsten.

Among various compounds of molybdenum which may be used, particularly preferred are $MoO_3$, molybdic acid and molybdates such as ammonium molybdate.

Among various compounds of tungsten which may be used, particularly preferred are $WO_3$, tungstic acid and tungstates such as ammonium tungstate.

These compounds of Group VIA metals may be used individually or as a mixture or composite of two or more of them.

Various compounds of Group VIII metals may be used as preparation materials of the aqueous solution to be used for the kneading, and preferred are compounds of cobalt and compounds of nickel.

Among various compounds of cobalt which may be used, particularly preferred are cobalt nitrate, cobalt acetate and basic cobalt carbonate.

Among various compounds of nickel which may be used, particularly preferred are nickel nitrate, nickel acetate and basic nickel carbonate.

These compounds of Group VIII metals may be used individually or as a mixture or composite of two or more of them.

The aqueous solution which is to be kneaded with the alumina gel and contains the compounds of Group VIA metals and Group VIII metals may be prepared by various methods, for example, by preparing respective aqueous solutions of the compounds of Group VIA and Group VIII metals followed by adding the aqueous solutions into the alumina gel separately or as a mixture, or by preparing an aqueous solution containing all of the compounds of Group VIA metals and Group VIII metals in the presence of the alumina gel, or by a combination thereof. In general, it is particularly suitable to prepare an aqueous solution containing all of the predetermined metal compounds and the aliphatic oxy acid described later and then add the aqueous solution into the alumina gel. At the time of preparing these aqueous solutions, in order to improve the solubility of the metal compounds, the properties of the aqueous solutions, such as pH, may be controlled by adding additives such as acids or ammonia.

The ratios among the compounds of Group VIA metals, the compounds of Group VIII metals and the alumina gel are adjusted so that the resulting catalyst composition contains them in the ratios specified in the present invention.

The catalyst composition of the present invention may be prepared suitably by carrying out the kneading of the alumina gel and the aqueous solution of the metal compounds in the presence of an aliphatic oxy acid.

Various kinds of aliphatic oxy acids may be used in the method of the present invention, and typical examples include citric acid, malic acid, tartaric acid, tartronic acid, glyceric acid, hydroxybutyric acid, hydracrylic acid, lactic acid, glyconic acid and a mixture thereof. Particularly preferred examples include citric acid and malic acid.

These aliphatic oxy acids may be used individually or in combination of two or more of them. The method of adding the aliphatic oxy acid is not particularly limited, and it is preferable to add an aqueous solution of the aliphatic oxy acid. Though the aqueous solution of the aliphatic oxy acid and the aqueous solution of the metal compounds may be added separately into the alumina gel, it is suitable to add a mixture of these aqueous solutions into the alumina gel before the kneading.

A suitable amount of the aliphatic oxy acid used for the kneading is 0.1 to 3.0 mols, preferably 0.5 to 2.8 mols per mol of the Group VIII metal contained in the compound of Group VIII metal. If the amount of the aliphatic oxy acid is less than 0.1 mol, the stability of the aqueous solution of the metal compounds may become unstable, so that the metal compounds cannot be supported in a highly dispersed state because of there precipitation or cohesion before completion of an effective kneading with the alumina gel. If it is more than 3.0 mols, the excessively high ratio of the aliphatic oxy acid may impair the supported state of the active metal components. Thus, either a too little or an excessive ratio of the aliphatic oxy acid may make it impossible to obtain the catalyst composition of the present invention having the above-described excellent properties.

The kneading is performed by sufficiently kneading at least the alumina gel, the aliphatic oxy acid and the aqueous solution of the metal compounds. The kneading may be carried out in the presence of other components, such as binders or agents for adjusting acidity, added according to demand. In order to perform the kneading effectively, it is preferable to control the water content by removing or adding water before or during the kneading.

The time of kneading cannot be specified uniformly since it depends on the kneading temperature, the kind or operation conditions of the kneader used or the amounts or composition of the kneaded materials. It is generally 0.1 to 24 hours, preferably 0.2 to 5 hours. The kneading temperature ranges generally from room temperature to 200° C., preferably from room temperature to 180° C.

The kneaded product thus obtained is generally molded into a desired shape by employing common methods after the water content is adjusted to suit to the molding method employed.

Thus obtained kneaded composition or molded product is generally calcined under appropriate conditions. The calcination is preferably carried out in an atmosphere of an air- or oxygen-containing gas. The temperature of calcination is generally 400° to 700° C., preferably 420° to 680° C. The time of calcination is generally 1 to 10 hours, preferably 2 to 8 hours. It is preferable to conduct the calcination so that the aliphatic oxy acid is sufficiently decomposed and burned off.

Thus, the catalyst composition of the present invention may be prepared easily and very efficiently. The catalyst composition of the present invention is not limited to the calcined one, and other ones obtained by subjecting the calcined one to various treatments also come within the scope of the present invention so far as they meet the qualifications of the catalyst composition of the present invention. Further, after the calcination as above described, the catalyst composition of the present invention may be adapted as the catalyst or a component of the catalyst for a desired reaction by using the above-described various pretreatment.

Hereinafter described is the process of hydrodesulfurization of the present invention to which the catalyst composition of the present invention suits particularly.

The process of hydrodesulfurization of the present invention comprises contacting a sulfur-containing hydrocarbon with the catalyst composition of the catalyst composition under hydrodesulfurizing conditions in the presence of hydrogen. The process of hydrodesulfurization of the present invention may be carried out in the same manner as in the conventional hydrodesulfurization with the proviso that the catalyst composition of the present invention is used as a catalyst. Hereinafter described are hydrocarbon distillates (sulfur-containing hydrocarbon distillates) suitable as the material hydrocarbon and reaction conditions suitable for the desulfurization.

Sulfur-containing hydrocarbons to be used as material oils and desulfurized in the process of the present invention are generally various hydrocarbons or hydrocarbon distillates which contain sulfur-containing hydrocarbon molecules and have boiling points of 50° to 525° C., and some examples include naphtha, kerosenes, gas oils, atmospheric residues, vacuum residues, vacuum gas oils, cracked gas oils and petroleums derived from oil shale or coal, which contain sulfur-containing hydrocarbon molecules. Particularly preferred are those of boiling points of 150° to 350° C., including kerosene distillates, gas oil distillates and kerosene-gas oil distillates. These may be used as a mixture of two or more of them according to circumstances.

The material oils preferably have a sulfur content of 0.01 to 5.0% by weight, more preferably 0.03 to 1.5% by weight.

The hydrodesulfurization is carried out by using the catalyst composition of the present invention as a catalyst. It is preferable to use the catalyst composition that was calcined as above described and, more preferably, further subjected to pretreatments, such as presulfurization, after the calcination.

The reaction temperature is generally 150° to 430° C., preferably 180° to 410° C.

The reaction pressure is generally 10 to 150 kg/cm$^2$, preferably 15 to 140 kg/cm$^2$.

The ratio of hydrogen used to the material oil used (H$_2$/oil ratio) ranges generally from 10 to 5000 Nl/Kl, preferably from 20 to 4000 Nl/kl.

Various reaction systems may be employed for the hydrodesulfurization, and a preferred example is a continuous flow system. In the case of a continuous flow system, LHSV is preferably adjusted to 0.1 to 30 hr$^{-1}$, preferably 0.1 to 28 hr$^{-1}$. LHSV is calculated from the feed rate of the material oil and the amount of the catalyst used, adjusted generally.

Using the catalyst composition of the present invention as a hydrodesulfurization catalyst permits the sulfur compounds contained in the material oils to be removed efficiently and sufficiently in the form of H$_2$S, thereby enabling easy production of hydrocarbon distillates having extremely reduced sulfur contents.

The after-treatments, such as separation, collection and purification, of the products obtained may be carried out easily by employing common methods. According to demand, unreacted hydrogen and a part of the product oil may be recycled. When the catalytic activity is reduced below a predetermined level, regeneration may be carried out. The regeneration can be performed easily by employing common methods.

Examples of the present invention are set forth below. It will be understood that these examples are for purposes of illustration only and are not to be construed as limiting the invention.

EXAMPLES 1 TO 6 AND COMPARATIVE EXAMPLES 1 AND 2

Example 1

(a) Preparation of an alumina gel (preparation of alumina gel A)

A 8% by weight aqueous sodium aluminate solution was heated to 60° C., and a 15% by weight aqueous aluminum sulfate solution was added thereto with stirring. A precipitate was deposited at pH 7.1. The precipitate was collected by filtration, and was then washed by pouring it into a 0.2% by weight aqueous ammonia and stirring. The washed precipitate was collected by filtration, to obtain the objective alumina gel (hereinafter, alumina gel A).

(b) Preparation of an aqueous solution of metal compounds (preparation of an aqueous solution of metal compounds A)

391 g (2.2 mols as Mo) of ammonium molybdate, 330 g (1.1 mol as Co) of cobalt nitrate [II] and 393 g (2.0 mols) of citric acid were dissolved in distilled water to form one liter of an aqueous solution. Thus, an aqueous solution of metal compounds containing citric acid (hereinafter, aqueous solution of metal compounds A) was obtained.

(c) Preparation of a catalyst composition (preparation of catalyst composition A)

164 cc of the aqueous solution of metal compounds A obtained in (b) was added to 833 g (110 g as Al$_2$O$_3$) of the alumina gel A obtained in (a), and the mixture was kneaded for 40 minutes at room temperature. Thereafter, the kneading system was heated to 100° C. while kneading was continued, to evaporate out water until the water suited to molding. The kneaded product was then extruded to form cylindrical pellets. The pellets were dried for three hours at 120° C. and was then calcined in a stream of air for three hours at 550° C., to obtain a catalyst A.

The composition and properties of the catalyst A were evaluated. The results are listed in Table 1.

The TPR L/H ratios listed in Table 1 were calculated from the data obtained from TPR spectrums which were measured as follows.

110 mg of a sample (in this Example 1, catalyst A) is filled into a quarts reaction tube, and the temperature at the part of the reaction tube where the sample was filled was elevated from room temperature to 1077° C. at a uniform temperature elevating rate (10° C./min) while a gas mixture (hydrogen: 65% by volume) of argon gas (carrier gas) and hydrogen gas was being passed through the sample at atmospheric pressure and at a rate of 20 ml/min, and the change of the consumption of hydrogen with temperature was measured by the thermal conductivity detector method (TCD method) to obtain a TPR spectrum. From the spectrum, a ratio of the area L of a low temperature reduction peak within a temperature range not lower than 25° C. and lower than 500° C. to the area H of a high temperature reduction peak within a temperature range from 500° C. to 1000° C., L/H, was calculated. The calculated values are listed in Table 1 in the column of TPR L/H ratio. With the proviso that when the low temperature reduction peak was not completely separated from the high temperature reduction peak, the areas L and H were calculated by dividing the low temperature reduction peak and the high temperature reduction peak from each other at a temperature exhibiting the least consumption of hydrogen.

(d) Hydrodesulfurization

Hydrodesulfurization of a gas oil distillate (LGO) having a sulfur content of 1.18% by weight and the distillation properties as listed in Table 3 was carried out in the manner as described below, and the activity of is the catalyst used was evaluated.

A fixed bed flow reactor was used, and the reaction tube of the reactor was filled with 100 cc of the catalyst A obtained in (c), and the catalyst A was presulfurized by passing the material oil (LGO) therethrough at 250° C. for 24 hours to presulfurize the catalyst A.

Thereafter, the material oil and hydrogen gas were fed and passed through the presulfurized catalyst A under the conditions of a reaction temperature of 310° to 350° C. (the temperature was elevated stepwise to 310° C., 330° C. and 350° C., in that order), a reaction pressure of 30 kg/cm$^2$, a hydrogen/material oil ratio of 200 Nl/kl and a LHSV of 4.0 hr$^{-1}$. From the sulfur content of the obtained product oil $S_2$ and the sulfur content of the material oil $S_1$, the desulfurization ratio $[(S_1-S_2)/S_2]\times 100$ was calculated to show the desulfurizing activity of the catalyst. The obtained desulfurizing activities (LGO desulfurizing activity) of the catalyst at the three points of temperature are listed in Table 1.

Example 2

(a) Preparation of an alumina gel (preparation of alumina gel B)

The alumina gel A obtained in Example 1(a) was dispersed in water, an aqueous ammonia was added thereto to adjust to pH 10.5, and the solution was aged at 90° C. for 24 hours. The aged alumina gel was collected by filtration. Hereinafter, the aged alumina gel will be called alumina gel B.

(b) Preparation of a catalyst composition (preparation of catalyst B)

The procedures from the kneading to the calcination carried out in Example 1(c) were repeated with the exception that 507 g (170 g as $Al_2O_3$) of the alumina gel B was used in place of the alumina gel A, and the amount of the aqueous solution of metal compounds A of 124 cc was altered to 253 cc, to obtain a catalyst B. The composition and properties of the catalyst B were evaluated in the same manner as in Example 1(c). The results are listed in Table 1.

(c) Hydrodesulfurization

The desulfurizing activity of the catalyst B was evaluated in the same manner as in Example 1(d) with the exception that 100 cc of the catalyst B was used in place of the catalyst A. The results are listed in Table 1.

Example 3

(a) Preparation of an aqueous solution of metal compounds (preparation of aqueous solution of metal compounds B)

391 g (2.2 mols as Mo) of ammonium molybdate, 330 g (1.1 mol as Co) of cobalt nitrate [II] and 275 g (2.0 mols) of malic acid were dissolved in distilled water to form one liter of an aqueous solution. Thus an aqueous solution of metal compounds containing malic acid (hereinafter, aqueous solution of metal compounds B) was prepared.

(b) Preparation of a catalyst composition (preparation of catalyst C)

The procedures from the kneading to the calcination carried out in Example 2(b) were repeated with the exception that 253 cc of the aqueous solution of metal compounds B was used in place of the aqueous solution of metal compounds A, to obtain a catalyst C. The composition and properties of the catalyst C were evaluated in the same manner as in Example 1(c). The results are listed in Table 1.

(c) Hydrodesulfurization

The desulfurizing activity of the catalyst C was evaluated in the same manner as in Example 1(d) with the exception that 100 cc of the catalyst C was used in place of the catalyst A. The results are listed in Table 1.

Example 4

(a) Preparation of an aqueous solution of metal compounds (preparation of aqueous solution of metal compounds C)

391 g (2.2 mols as Mo) of ammonium molybdate, 330 g (1.1 mol as Co) of cobalt nitrate [II] and 308 g (2.0 mols) of tartaric acid were dissolved in distilled water to form 1 liter of an aqueous solution. Thus an aqueous solution of metal compounds containing tartaric acid (hereinafter, it will be called aqueous solution of metal compounds C) was prepared.

(b) Preparation of a catalyst composition (preparation of catalyst D)

The procedures from the kneading to the calcination carried out in Example 2(b) were repeated with the exception that 250 cc of the aqueous solution of metal compounds C was used in place of the aqueous solution of metal compounds A, to obtain a catalyst D. The composition and properties of the catalyst D were evaluated in the same manner as in Example 1(c). The results are listed in Table 1.

(c) Hydrodesulfurization

The desulfurizing activity of the catalyst D was evaluated in the same manner as in Example 1(d) with the exception that 100 cc of the catalyst D was used in place of the catalyst A. The results are listed in Table 1.

Example 5

(a) Preparation of an aqueous solution of metal compounds (preparation of aqueous solution of metal compounds D)

391 g (2.2 mols as Mo) of ammonium molybdate, 330 g (1.1 mol as Co) of cobalt nitrate [II] and 156 g (2.0 mols) of glyconic acid were dissolved in distilled water to form one liter of an aqueous solution. Thus an aqueous solution of metal compounds containing glyconic acid (hereinafter, aqueous solution of metal compounds D) was prepared.

(b) Preparation of a catalyst composition (preparation of catalyst E)

The procedures from the kneading and calcination carried out in Example 2(b) were repeated with the exception that 250 cc of the aqueous solution of metal compounds D was used in place of the aqueous solution of metal compounds A, to obtain a catalyst E. The composition and properties of the catalyst E were evaluated in the same manner as in Example 1(c). The results are listed in Table 1.

(c) Hydrodesulfurization

The desulfurizing activity of the catalyst E was evaluated in the same manner as in Example 1(d) with the exception that 100 cc of the catalyst E was used in place of the catalyst A. The results are listed in Table 1.

Example 6

(a) Preparation of an aqueous solution of metal compounds (preparation of aqueous solution of metal compounds E)

391 g (2.2 mols as Mo) of ammonium molybdate, 330 g (1.1 mol as Co) of cobalt nitrate [II] and 185 g (2.0 mols) of lactic acid were dissolved in distilled water to form one liter of an aqueous solution. Thus an aqueous solution of metal compounds containing lactic acid (hereinafter, aqueous solution of metal compounds E) was prepared.

(b) Preparation of a catalyst composition (preparation of catalyst F)

The procedures from the kneading to the calcination carried out in Example 2(b) were repeated with the exception that 250 cc of the aqueous solution of metal compounds E was used in place of the aqueous solution of metal compounds A, to obtain a catalyst F. The composition and properties of the catalyst F were evaluated in the same manner as in Example 1(c). The results are listed in Table 1.

(c) Hydrodesulfurization

The desulfurizing activity of the catalyst F was evaluated in the same manner as in Example 1(d) with the exception that 100 cc of the catalyst F was used in place of the catalyst A. The results are listed in Table 1.

Comparative Example 1

(a) Preparation of an aqueous solution of metal compounds F 391 g (2.2 mols as Mo) of ammonium molybdate and 330 g (1.1 mol as Co) of cobalt nitrate [II] were dissolved in distilled water to form one liter of an aqueous solution. Thus an aqueous solution of metal compounds (hereinafter, aqueous solution of metal compounds F) was prepared. The aqueous solution of metal compounds F is the same as the aqueous solution of metal compounds A or B with the exception that it contains no aliphatic oxy acids.

(b) Preparation of a catalyst G

The procedures from the kneading to the calcination carried out in Example 2(b) were repeated with the exception that 253 cc of the aqueous solution of metal compounds F obtained in (a) was used in place of the aqueous solution of metal compounds A, to obtain a catalyst G. The composition and properties of the catalyst G were evaluated in the same manner as in Example 1(c). The results are listed in Table 2.

(c) Hydrodesulfurization

The desulfurizing activity of the catalyst G was evaluated in the same manner as in Example 1(d) with the exception that 100 cc of the catalyst G was used in place of the catalyst A. The results are listed in Table 2.

Comparative Example 2

(a) Preparation of a catalyst H

The alumina gel B obtained in Example 2(a) was molded, was dried for three hours at 120° C., and was then calcined in a stream of air at 550° C. for three hours, to obtain an alumina support. 170 g of the alumina support was impregnated with 125 cc of the aqueous solution of metal compounds A obtained in Example 1(b) by employing a vacuum impregnation method. The impregnated alumina support was dried for three hours at 120° C. and was then calcined for three hours at 550° C. in a stream of air. The calcined product was further impregnated with 125 cc of the aqueous solution of metal compounds A by employing an vacuum impregnation method. The impregnated product was dried for three hours at 120° C. and was then calcined for three hours at 550° C. in a stream of air, to obtain a catalyst H.

The composition and properties of the catalyst H were evaluated in the same manner as in Example 1(c). The results are listed in Table 2.

(b) Hydrodesulfurization

The desulfurizing activity of the catalyst H was evaluated in the same manner as in Example 1(d) with the exception that 100 cc of the catalyst H was used in place of the catalyst A. The results are listed in Table 2.

TABLE 1

| | Examples | | | | | |
|---|---|---|---|---|---|---|
| | 1 | 2 | 3 | 4 | 5 | 6 |
| Composition | | | | | | |
| CoO (wt %) | 7.6 | 7.3 | 7.3 | 7.5 | 7.3 | 7.6 |
| $MoO_3$ (wt %) | 29.7 | 29.5 | 27.8 | 27.9 | 28.4 | 28.7 |
| TPR L/H ratio | 0.37 | 0.38 | 0.36 | 0.36 | 0.36 | 0.36 |
| XRD pattern[1)] | o | o | o | o | o | o |
| Specific surface ($m^2$/g) | 275 | 306 | 261 | 268 | 272 | 265 |

TABLE 1-continued

|  | Examples | | | | | |
| --- | --- | --- | --- | --- | --- | --- |
|  | 1 | 2 | 3 | 4 | 5 | 6 |
| Average pore diameter (Å) | 40> | 78 | 72 | 74 | 75 | 72 |
| Whole pore volume (>40 Å) (cc/g) | 0.23 | 0.32 | 0.34 | 0.32 | 0.30 | 0.30 |
| Ratio of the volume of pores not larger than 85 Å to whole pore volume (%) | 88.6 | 85.6 | 89.1 | 87.5 | 88.8 | 89.4 |
| LGO desulurizing activity (Desulurizing ratio) | | | | | | |
| 310° C. | 77.8 | 77.4 | 77.6 | 77.5 | 77.2 | 77.4 |
| 330° C. | 90.3 | 89.2 | 89.7 | 89.8 | 90.0 | 89.5 |
| 350° C. | 96.2 | 96.0 | 96.1 | 96.1 | 96.2 | 96.0 |

[1]o: No diffraction peaks other than that of alumina as observed.
x: Diffraction peaks other than that of alumina were observed

TABLE 2

|  | Comparative examples | |
| --- | --- | --- |
|  | 1 | 2 |
| Composition | | |
| CoO (wt %) | 6.6 | 7.6 |
| MoO$_3$ (wt %) | 26.4 | 30.0 |
| TPR L/H ratio | 0.47 | 0.62 |
| XRD pattern[1] | x | x |
| Specific surface (m$^2$/g) | 233 | 153 |
| Average pore diameter (Å) | 85 | 153 |
| Whole pore volume (>40 Å) (cc/g) | 0.4 | 0.4 |
| Ratio of the volume of pores not larger than 85 Å to whole pore volume (%) | 60.0 | 39.1 |
| LGO desulfurizing activity (Desulfurizing ratio) | | |
| 310° C. | 69.3 | 71.1 |
| 330° C. | 82.1 | 84.9 |
| 350° C. | 93.2 | 93.8 |

[1]o: No diffraction peaks other than that of alumina was observed.
x: Diffraction peaks other than that of alumina were observed.

TABLE 3

| Distillation properties of material LGO | |
| --- | --- |
| Distillation percentage (%) | Temperature (°C.) |
| IBP | 206 |
| 10 | 250 |
| 20 | 264 |
| 30 | 274 |
| 50 | 291 |
| 70 | 313 |
| 80 | 326 |
| 90 | 344 |
| FBP | 368 |

What is claimed is:

1. A process for hydrodesulfurizing a sulfur-containing hydrocarbon which comprises contacting the sulfur-containing hydrocarbon with a catalyst composition under hydrodesulfurizing conditions in the presence of hydrogen, the catalyst composition comprising (a) a Group VIA metal, (b) a Group VIII metal and (c) an alumina, the Group VIA metal and the Group VIII metal being in a combined amount 20% to 70% by weight based on the total of the Group VIA metal, the Group VIII metal and the alumina, calculated on the basis that the Group VIA metal and the Group VIII metal are stable oxides thereof, and the alumina is Al$_2$O$_3$, the catalyst composition being characterized by (i) an X-ray diffraction pattern having no diffraction peak other than a diffraction peak of the alumina, and (ii) after being air-calcined at 550° C. for three hours, being characterized by a TPR spectrum from a temperature-programmed reduction of the air-calcined catalyst in a stream of hydrogen with a temperature being elevated from 25° C. to above 1000° C. at a rate of 10° C./min, wherein the TPR spectrum results in a ratio L/H of 0.1 to 0.45, wherein L is an area of a low temperature reduction peak within a temperature from not lower than 25° C. to lower than 500° C. and H is an area of a high temperature reduction peak within a temperature from 500° C. to 1000° C., with the proviso that when the low temperature reduction peak is not completely separated from the high temperature reduction peak, the areas L and H are calculated by dividing the low temperature reduction peak and the high temperature reduction peak from each other at a temperature exhibiting the least consumption of hydrogen.

2. The process as claimed in claim 1, wherein the sulfur-containing hydrocarbon has a sulfur content of 0.01 to 5.0% by weight, and the hydrodesulfurization is carried out at a temperature of 150° to 430° C. at a reaction pressure of 10 to 150 kg/cm$^2$ in the presence of 10 to 5000 Nl of hydrogen per kilogram of the sulfur-containing hydrocarbon.

3. The process as claimed in claim 2, wherein the Group VIA metal and the Group VIII metal are in a combined amount of 22 to 50% by weight, and the ratio L/H is from 0.15 to 0.43.

4. The process as claimed in claim 2, wherein the Group VIII metal is selected from the group consisting of cobalt, nickel and a mixture thereof and the Group VIA metal is selected from the group consisting of molybdenum, tungsten and a mixture thereof.

5. The process as claimed in claim 3, wherein the Group VIII metal is selected from the group consisting of cobalt, nickel and a mixture thereof and the Group VIA metal is selected from the group consisting of molybdenum, tungsten and a mixture thereof.

6. The process as claimed in claim 5, wherein the Group VIII metal is cobalt and the Group VIA metal is molybdenum.

7. The process as claimed in claim 1, wherein the Group VIA metal is selected from the group consisting of molybdenum and tungsten in an amount of 10 to 60% by weight as calculated as $MoO_3$ and $WO_3$ and the Group VIII metal is selected from the group consisting of cobalt and nickel in an amount of 2 to 30% by weight as calculated as CoO and NiO.

8. The process as claimed in claim 3, wherein the Group VIA metal is in an amount of 12 to 50% by weight and the Group VIII metal is in an amount of 3 to 15% by weight.

9. The process as claimed in claim 6, wherein the weight ratio of the cobalt to the molybdenum is calculated as $CoO/MoO_3$ is 0.10 to 0.50.

10. The process as claimed in claim 6, wherein the weight ratio of the cobalt to the molybdenum calculated as $CoO/MoO_3$ is 0.15 to 0.45.

11. The process as claimed in claim 1, wherein the alumina is in an amount of 30 to 80% by weight calculated as $Al_2O_3$.

12. The process as claimed in claim 1, wherein the catalyst composition contains pores of 150 angstroms or less in diameter in an amount of 80 to 100% by volume, based on the whole pore volume.

13. The process as claimed in claim 8, wherein the catalyst composition contains pores of 150 angstroms or less in diameter in an amount of 80 to 100% by volume, based on the whole pore volume.

14. The process as claimed in claim 13, wherein the catalyst composition contains pores of 150 angstroms or less in diameter in an amount of 82 to 98% by volume, based on the whole pore volume.

15. The process as claimed in claim 10, wherein the molybdenum is in an amount of 12 to 50% by weight calculated as $MoO_3$, and the cobalt is in an amount of 3 to 15% by weight calculated as CoO.

16. The process as claimed in claim 15, wherein the catalyst composition contains pores of 150 angstroms or less in diameter in an amount of 82 to 98% by volume, based on the whole pore volume.

17. The process as claimed in claim 2, wherein the sulfur-containing hydrocarbon has a boiling point of 50 to 525 and is at least one selected from the group consisting of naphtha, kerosenes, gas oils, atmospheric residues, vacuum residues, vacuum gas oils, cracked gas oils, petroleum derived from oil shale and petroleum derived from coal.

18. The process as claimed in claim 2, wherein the sulfur-containing hydrocarbon has a boiling point of 150° to 350° C. and is at least one selected from the group consisting of kerosene distillates, gas oil distillates and kerosene-gas oil distillates.

19. The process as claimed in claim 1, wherein the sulfur-containing hydrocarbon has a sulfur content of 0.03 to 1.5% by weight, and the hydrodesulfurization is carried out at a temperature of 180° C. to 410° C. at a reaction pressure of 15 to 140 $kg/cm^2$ in the presence of 20 to 4000 Nl of hydrogen per kilogram of the sulfur-containing hydrocarbon.

* * * * *